United States Patent [19]

Medina

[11] Patent Number: 5,049,608
[45] Date of Patent: Sep. 17, 1991

[54] ACRYLIC PRESSURE SENSITIVE ADHESIVE COMPOSITIONS HAVING IMPROVED LOW TEMPERATURE ADHESION

[75] Inventor: Steven W. Medina, Orefield, Pa.

[73] Assignee: Air Products and Chemicals, Inc., Allentown, Pa.

[21] Appl. No.: 346,772

[22] Filed: May 3, 1989

[51] Int. Cl.$^5$ ............................................. C08K 5/05
[52] U.S. Cl. .................................... 524/375; 524/376; 524/556; 524/564
[58] Field of Search ................ 524/375, 376, 564, 556

[56] References Cited

U.S. PATENT DOCUMENTS

| 4,145,327 | 3/1979 | Dolch et al. ........................ 524/375 |
| 4,357,270 | 11/1982 | Pippa et al. ........................ 524/375 |
| 4,371,659 | 2/1983 | Druschke et al. .................. 524/599 |
| 4,424,298 | 1/1984 | Penzel et al. ........................ 524/747 |
| 4,492,724 | 1/1985 | Allbright et al. .................. 524/375 |

FOREIGN PATENT DOCUMENTS 49-23813  6/1974  Japan ................................... 524/375

Primary Examiner—Joseph L. Schofer
Assistant Examiner—R. H. Delmendo
Attorney, Agent, or Firm—Michael Leach; James C. Simmons; William F. Marsh

[57] ABSTRACT

A pressure sensitive adhesive composition having good low temperature and room temperature performance comprising (a) a 2-ethylhexyl acrylate/polar monomer copolymer emulsion, the copolymer having a Tg from $-70°$ to $-40°$ C. and (b) 3 to 9 wt %, based on copolymer, nonionic poly(ethyleneoxy) ethanol having at least 70 ethyleneoxy units.

15 Claims, No Drawings

ACRYLIC PRESSURE SENSITIVE ADHESIVE COMPOSITIONS HAVING IMPROVED LOW TEMPERATURE ADHESION

TECHNICAL FIELD

The present invention relates to aqueous acrylic polymer emulsions useful as pressure sensitive adhesives and, more particularly, relates to such acrylic polymer emulsions containing an additive to improve low temperature adhesion.

BACKGROUND OF THE INVENTION

The paper label industry requires aqueous emulsion based pressure sensitive adhesives (PSA) which will provide good adhesion and tack performance at 0° to 20° F. (−18° to −7° C.) on various substrates. It is also desired that the PSAs be suitable, with aggressive adhesion, at 40° F. to 100° F. (4° to 38° C.). The types of adhesives meeting these requirements are called "all temperature" PSA's.

Generally, acrylic PSA's have been best suited for these applications due to their low Tg and relative cost/performance ratios. However, to provide adequate performance at low temperatures, the acrylic adhesives are generally designed to have very low Tg's (less than −50° C.) and possess significant low molecular weight fractions. This combination of features generally results in poor room temperature performance and low cohesive strength which contributes to label converting/processing difficulties.

An alternative method to that of designing the acrylic adhesive with the above features is to formulate an acrylic PSA which originally had good room temperature performance. Generally, compatible plasticizing agents are introduced to reduce the Tg of the acrylic polymer and promote flow during low temperature applications. This approach, however, also tends to diminish room temperature performance and significantly decreases cohesive strength. Also, because plasticizers are generally very low in molecular weight, they may be fugitive resulting in a change in PSA performance with time.

The PSA industry requires a non-fugitive, easily introduced additive to an aqueous acrylic polymer emulsion that will promote reduced temperature adhesive performance without significantly diminishing room temperature performance or cohesive strength.

Japanese Patent Publn. No. 1974-23,813 discloses pressure sensitive bonding agents for use at low temperatures made of compositions comprising at least one nonionic surface active agent that contains an ethylene oxide group as its hydrophilic component and at least one copolymer. Actual Example 1 shows a mixture of 180 weight parts of a 50 wt % aqueous emulsion of an ethyl acrylate/vinyl acetate/methacrylic acid copolymer blended with 100 weight parts of polyoxyethylene nonylphenyl ether (HLB=13).

SUMMARY OF THE INVENTION

The present invention provides a low temperature pressure sensitive adhesive composition containing an aqueous pressure sensitive adhesive copolymer emulsion and a nonionic surfactant. The aqueous copolymer emulsion comprises a 2-ethylhexyl acrylate-containing copolymer having a Tg in the range of −70° to −40° C. About 3 to 9 wt % (based on copolymer emulsion solids) of a nonionic poly(ethyleneoxy) surfactant, preferably an alkylphenoxy poly(ethyleneoxy) ethanol, having at least 70 ethylene oxide units is blended into the aqueous emulsion.

The incorporation of this particular nonionic surfactant into the acrylic PSA emulsion improves the dry film low temperature (0° to 20° F.; −18° to −7° C.) adhesive performance without significant loss in cohesive strength (shear strength) or higher temperature (40° to 100° F.; 4° to 38° C.) adhesive performance.

DETAILED DESCRIPTION OF THE INVENTION

The acrylic emulsions used in the pressure sensitive adhesive compositions according to the invention comprise an aqueous dispersion of 40 to 75 wt %, preferably 50 to 65 wt %, acrylic copolymer having a Tg of −70° to −40° C., preferably −60° to −45° C. The copolymer contains at least 40 wt % to about 97 wt % 2-ethylhexyl acrylate (2-EHA), preferably at least 50 wt % 2-EHA. Contemplated as the functional, or operative, equivalent of 2-EHA for the purposes of this invention are acrylic or methacrylic acid esters of $C_4$–$C_{12}$ alkanols. The copolymer also desirably contains about 5 to 20 wt %, preferably 7 to 15 wt %, polar comonomer, for example, vinyl acetate and/or acrylonitrile. Furthermore, the copolymer may also contain up to 25 wt % of other comonomers typically used in the acrylic PSA art such as, for example, vinyl chloride, styrene, (meth)acrylic acid and (meth)acrylamide.

The acrylic copolymer emulsions are suitably prepared by conventional emulsion polymerization conditions for preparing aqueous acrylic PSA emulsions. Representative of such emulsion techniques are the following: U.S. Pat. Nos. 4,371,659 and 4,424,298 which are incorporated by reference.

In order to obtain the superior performance of the low temperature pressure sensitive adhesive compositions of the invention, the acrylic PSA copolymer emulsions are blended with a $C_7$–$C_{18}$ alkylphenoxy poly(ethyleneoxy) ethanol having at least 70 ethylene oxide (EO) units. It is preferred that this nonionic surfactant contain about 70 to 150 EO units, most desirably about 100 EO units and that the alkyl substituent on the phenoxy moiety be an octyl or nonyl group. These nonionic materials are merely blended into the acrylic copolymer emulsion at level ranging from 3 to 9 wt % based on emulsion solids, preferably 4 to 6 wt %.

Suitable alkylphenoxy poly(ethyleneoxy) ethanols for use in the compositions are marketed under the trademark Igepal by GAF Corp.

The nonionic polyethylene oxide surfactant, which has a relatively high Tg compared to the acrylic PSA emulsion copolymer, is believed to be partially compatible and increases the storage modulus (increase stiffness) under bond rupture conditions, but due to low molecular weight tends to act as a plasticizer under bond formation conditions and increases flow. This both promotes low temperature performance along with increasing the hydrophilicity of the pressure sensitive adhesive composition making condensation frost less of a problem during adhesion.

The pressure sensitive adhesive compositions of the invention are suitable for making pressure sensitive adhesive sheets for use at low temperatures. A base, such as sheet (foil) or tape, of paper, cloth, metal, synthetic resins and the like, is coated with an appropriate amount of the PSA composition and the coated product is dried. In order to store the PSA adhesive-coated base for use at low temperature, it is desirable that the surface coated with the PSA composition be covered with a peel-off sheet treated with silicone or some other appropriate release material.

In addition to the use of the PSA compositions of the invention in paper label applications, the combination of low temperature performance and good room temperature shear should be obtainable on other constructions and applications such as transfer and mounting tape, sound deadening PSA constructions and other areas where acrylic PSA's have been used where improved low temperature performance without detriment to other temperature range adhesion is desired.

EXAMPLE 1

In this example Flexcryl® 1625 copolymer emulsion was blended with 4%, based on emulsion solids, of an alkylphenoxy poly(ethyleneoxy) ethanol having various EO content. Flexcryl 1625 emulsion comprises a 2-ethylhexyl acrylate/vinyl acetate/methyl methacrylate/acrylic acid copolymer containing minor amounts of other comonomers and has a Tg of −48° C. Flexcryl 1625 copolymer emulsion is prepared essentially according to U.S. Pat. No. 4,371,659 and is marketed by Air Products and Chemicals, Inc. The PSA compositions were evaluated in a paper label adhesive application.

Paper labels (52 lb facestock) were prepared with 22 g/m² dry coatweight. The substrates and labels were reduced in temperature to 20° F. (−7° C.) for 30 minutes, applied using Pressure Sensitive Tape Council (PSTC) methodology and then peeled after 5 minutes at a 180° angle at the reduced temperature using a tensiometer crosshead rate of 12 in/min. Improvements are registered by the greater percentage paper label tear, while also maintaining cohesive strength/shear performance of >100 hr. The shear performance is determined using a 1×1 inch specimen and a 1,000 g weight according to PSTC-7 (74° F.; 23° C.) on a stainless steel substrate.

TABLE 1

| Run | Igepal Surfactant | EO | SS | LDPE | CKP | Shear (hr) |
|---|---|---|---|---|---|---|
| 1 | None | — | 100% PT | 0% PT | 0% PT | >100 |
| 2 | CO-630 | 9 | 80% PT | 60% PT | 20% PT | 6.3 |
| 3 | CO-880 | 30 | 100% PT | 50% PT | 40% PT | 4.9 |
| 4 | CO-970 | 50 | 100% PT | 100% PT | 70% PT | 14 |
| 5 | CO-980 | 70 | 100% PT | 100% PT | 100% PT | >100 |
| 6 | CO-990 | 100 | 100% PT | 100% PT | 100% PT | >100 |
| 7 | DM-970 | 150 | 100% PT | 100% PT | 100% PT | >100 |

SS = Stainless Steel
LDPE = Low Density Polyethylene
CKP = Corrugated Kraft Paper
PT = Paper Tear It can be seen from the data in Table 1 that at least a 70 EO content was required in the nonionic surfactant to provide a pressure sensitive adhesive composition possessing the balance of improved low temperature performance with excellent shear performance (> than 100 hr.).

EXAMPLE 2

This example shows that the incorporation of the nonionic surfactant having at least 70 EO units does not detrimentally influence the room temperature performance of Flexcryl 1625 emulsion at 4% level.

Paper labels (52 lb facestock) were prepared with 22 g/m² coatweight. The substrates and paper labels were conditioned at 74° F. (23° C.) according to PSTC methodology. PSTC-1 peel performance and loop tack (1 in² contact area, 1×8 inch sample strip, 1 sec dwell) were evaluated and compared to the base acrylic emulsion. Comparable performance to the base acrylic emulsion is designated by (0), superior performance by (+) and inferior performance versus the base emulsion as (−).

TABLE 2

| | | | 74° F. (23° C.) Paper Label Performance | | | | | |
| | Igepal | | 180° Peel | | | Loop Tack | | |
| Run | Surfactant | EO | SS | LDPE | CKP | SS | LDPE | CKP |
|---|---|---|---|---|---|---|---|---|
| 8 | None | — | 0 | 0 | 0 | 0 | 0 | 0 |
| 9 | CO-980 | 70 | 0 | 0 | + | 0 | 0 | + |
| 10 | CO-990 | 100 | 0 | 0 | 0 | 0 | 0 | 0 |
| 11 | DM-970 | 150 | 0 | 0 | + | + | + | + |

The data in Table 2 demonstrates that the incorporation of Igepal surfactants in Runs 9–11 provided a PSA composition demonstrating room temperature performance that was comparable or superior to the base acrylic PSA emulsion.

EXAMPLE 3

In this example the Flexcryl 1625 copolymer emulsion was blended with various amounts of Igepal CO-990 surfactant (100 EO) and paper labels were evaluated for 20° F. (−7° C.), 180° peels (PSTC-1) and room temperature loop tack on three substrates.

Paper labels (52 lb facestock) were prepared with 22 g/m² coatweight. The substrates and paper labels were equilibrated at 20° F. (−7° C.) for thirty minutes for the 180° peel evaluation. The labels were applied and then peeled after one minute using a tensiometer rate of 12 in/min at 20° F. (−7° C.). Performance comparable to the base acrylic emulsion copolymer was demonstrated by (0), superior performance by (+) and inferior performance by (−).

TABLE 3

| | Igepal | 180° Peel, 20° F. (−7° C.) | | | Loop Tack (RT) | |
| Run | CO-990 (wt. %) | SS | LDPE | CKP | LDPE | CKP |
|---|---|---|---|---|---|---|
| 12 | None | 0 | 0 | 0 | 0 | 0 |
| 13 | 2 | 0 | 0 | 0 | 0 | 0 |
| 14 | 3 | + | + | + | 0 | 0 |
| 15 | 4 | + | + | + | 0 | 0 |
| 16 | 5 | + | + | + | 0 | 0 |
| 17 | 7 | + | + | + | 0 | 0 |
| 18 | 9 | + | + | + | − | − |

Table 3 shows that the upper and lower effective limits of the nonionic surfactant were 3 to 9 wt %, respectively.

EXAMPLE 4

This example demonstrates that not all acrylic PSA copolymer emulsions have their low temperature performance improved by the addition of a nonyl phenoxy poly(ethyleneoxy) surfactant.

Paper labels (52 lb facestock) were prepared with 22 g/m² coatweight. The substrates and paper labels were equilibrated at 0° F. (−18° C.) for thirty minutes. Labels were applied using PSTC methodology and then peeled at 180° angle at 12 in/min at 0° F. (−18° C.). In each of Runs 19-22, the acrylic copolymer emulsion was blended with 4 wt %, based on copolymer solids, Igepal 990 surfactant. Performance comparable to the base adhesive is designated by (0), superior performance by (+) and inferior peel performance by (−).

able low temperature and room temperature performance.

TABLE 5

| Run | Nonionic Surfactant (4%) | EO | Hydrophile | Hand Peels 20° F. CKP | Instron Peel 20° F. (pli) CKP | LDPE | Shear (hr) SS |
|---|---|---|---|---|---|---|---|
| 23 | Igepal CO-890 | 40 | nonylphenoxy | poor | — | — | — |
| 24 | Igepal CO-990 | 100 | nonylphenoxy | excellent | 1.3 IPT | 0.3A | 0.9C |
| 25 | Pluronic P65 | 38 | poly(propyleneoxy) | good-excellent | 0.5 5% PT | 0.2A | — |
| 26 | Pluronic P105 | 65 | poly(propyleneoxy) | excellent | 1.7 IPT | 0.2A | 0.3C |

Failure Modes
A - adhesion failure
C - cohesion failure
IPT - immediate paper tear
PT - paper tear
*½ × ½ inch; 500 g The data in Table 5 shows that only the PSA composition containing a nonionic surfactant having 100 EO units demonstrated combined excellent low temperature peel and good room temperature shear.

EXAMPLE 6

This example demonstrates that the nonionic surfactant having at least 70 EO units must be post-added to the acrylic copolymer emulsion. If the specified nonionic surfactant is present during the polymerization process for preparing the emulsion, the properties of the resulting PSA emulsion composition do not compare with the combination of superior properties manifested by the same acrylic copolymer emulsion containing the same nonionic surfactant as a post-additive.

In each of Runs 27–29, Flexcryl 1625 copolymer emulsion was prepared following the same procedure. Run 28 had 4% Igepal CO-990 surfactant (EO=100) added subsequent to the polymerization process, Run 29 had 4% Igepal CO-990 surfactant added to the polymerization reaction and Run 27 had no addition of the Igepal surfactant.

The emulsions of Runs 27–29 were evaluated as adhesives with a standard coater package. Table 6 presents the paper label performance data.

TABLE 4

| Run | Acrylic Copolymer (Tg° C.) | 180° Peel, 0° F. (−18° C.) | | |
|---|---|---|---|---|
| | | SS | LDPE | CKP |
| 19 | 2-EHA/MMA/VAM (−48° C.) | + | + | + |
| 20 | 2-EHA/VAM/AN (−40° C.) | + | + | + |
| 21 | Butyl Acrylate (−50° C.) | 0 | 0 | 0 |
| 22 | DOM/VAM (−30° C.) | 0 | 0 | 0 |

2-EHA = 2-ethylhexyl acrylate
MMA = methyl methacrylate
VAM = vinyl acetate
DOM = dioctyl maleate
AN = acrylonitrile Only Runs 19 and 20 in which the 2-EHA emulsion copolymers containing a polar monomer (VAM, AN) demonstrated improved low temperature performance when blended with 4 wt % Igepal CO-990 surfactant.

EXAMPLE 5

This example demonstrates that the nonionic surfactant blended with the acrylic copolymer emulsion must have at least 70 EO units in order to provide an adhesive composition possessing both commercially accept-

TABLE 6

| Run | 4% Igepal CO-990 | SS | LDPE | CKP | |
|---|---|---|---|---|---|
| | | 180° PEEL-RT[1] (pli) | | | |
| 27 | None | 4.3A 0-50% PT | 2.6 | 2.4 0-50% PT | |
| 28 | Post-add | IPT | 1.7 0-100% PT | IPT | |
| 29 | During Polymerization | 2.4A | 1.3A | 2.5 0-50% PT | |
| | | Loop Tack-RT (pli) | | | SS SHEAR[3] (hr) |
| 27 | None | 3.8A | 2.3A | 1.9A LTFT | 40-60 |
| 28 | Post-add | 2.9A | 1.6A | 1.6A | 80c |
| 29 | During Polymerization | 2.2A | 1.6A | 1.0A | 24c |
| | | 180° Peel - 20° F[2] (pli) | | | |
| 27 | None | 3.0 40-60% PT | 2.8A | 2.4HFT | |
| 28 | Post-add | IPT | IPT | 3.6 30-100% PT | |
| 29 | During | 3.6A | 2.8A | 2.3A | |

TABLE 6-continued

| Run | 4% Igepal CO-990 | SS | LDPE | CKP |
|---|---|---|---|---|
| Polymerization | | | | |

Failure Modes
A - adhesion
c - cohesion
HFT - heavy fiber tear
FT - fiber tear
IPT - immediate paper tear
LT - light
PT - paper tear
[1] 30 min. dwell
[2] 1 min dwell
[3] 0 dwell; 1 × 1 inch; 1000 g

STATEMENT OF INDUSTRIAL APPLICATION

The present invention provides an acrylic pressure sensitive adhesive composition having improved low temperature performance while maintaining room temperature adhesive performance.

I claim:

1. In a low temperature pressure sensitive adhesive composition comprising an aqueous emulsion of a pressure sensitive adhesive copolymer and a post-added nonionic poly(ethyleneoxy) surfactant, the improvement which comprises a 2-ethylhexyl acrylate/polar monomer copolymer containing 40 to 97 wt % 2-ethylhexyl acrylate and having a Tg of −70° to −40° C. as the pressure sensitive adhesive copolymer, and 3–9 wt %, based on emulsion solids, nonionic poly(ethyleneoxy) ethanol surfactant containing at least 70 ethylene oxide units.

2. The pressure sensitive adhesive composition of claim 1 in which the nonionic surfactant is a $C_7$–$C_{18}$ alkylphenoxy poly(ethyleneoxy) ethanol.

3. The pressure sensitive adhesive composition of claim 2 in which the alkyl group is octyl or nonyl.

4. The pressure sensitive adhesive composition of claim 1 in which the nonionic surfactant contains 70 to 150 ethylene oxide units.

5. The pressure sensitive adhesive composition of claim 1 in which the nonionic surfactant contains about 100 ethylene oxide units.

6. The pressure sensitive adhesive composition of claim 1 in which the copolymer has a Tg ranging from −60° to −45° C.

7. The pressure sensitive adhesive composition of claim 1 in which the copolymer contains 5 to 20 wt % polar comonomer.

8. In a low temperature pressure sensitive adhesive composition comprising an aqueous emulsion of a pressure sensitive adhesive copolymer and a post-added nonionic poly(ethyleneoxy) surfactant, the improvement which comprises a 2-ethylhexyl acrylate/polar monomer copolymer containing 40 to 97 wt % 2-ethylhexyl acrylate and having a Tg of −70° to −40° C. as the pressure sensitive adhesive copolymer and 3 to 9 wt %, based on emulsion solids, $C_8$–$C_9$ alkylphenoxy poly(ethyleneoxy) ethanol containing about 70 to 150 ethylene oxide units.

9. The pressure sensitive adhesive composition of claim 8 in which the alkyl group is nonyl.

10. The pressure sensitive adhesive composition of claim 8 in which the alkylphenoxy poly(ethyleneoxy) ethanol contains about 100 ethylene oxide units.

11. The pressure sensitive adhesive composition of claim 9 in which the alkylphenoxy poly(ethyleneoxy) ethanol contains about 100 ethylene oxide units.

12. The pressure sensitive adhesive composition of claim 9 in which the copolymer has a Tg ranging from −60° to −45° C.

13. The pressure sensitive adhesive composition of claim 8 in which the copolymer consists essentially of 50 to 97 wt % 2-ethylhexyl acrylate and 5 to 20 wt % of a polar monomer which is vinyl acetate.

14. In a low temperature pressure sensitive adhesive composition comprising an aqueous emulsion of a pressure sensitive adhesive copolymer and a post-added nonionic poly(ethyleneoxy) surfactant, the improvement which comprises a 2-ethylhexyl acrylate/vinyl acetate/methyl methacrylate/acrylic acid copolymer having a Tg ranging from −60° to −45° C. as the pressure sensitive adhesive copolymer and 4–6 wt %, based on emulsion solids, nonyl phenoxy poly(ethyleneoxy) ethanol containing about 70 to 150 ethylene oxide units.

15. The pressure sensitive adhesive composition of claim 14 in which the nonionic surfactant contains about 100 ethylene oxide units.

* * * * *